(12) United States Patent
Coufal et al.

(10) Patent No.: US 8,806,563 B2
(45) Date of Patent: *Aug. 12, 2014

(54) SYSTEMS AND METHODS FOR VIDEO TRANSMISSION

(71) Applicant: Qwest Communications International Inc., Denver, CO (US)

(72) Inventors: William C. Coufal, Wichita, KS (US); Randall E. Adams, North Salt Lake City, UT (US); Kurt E. Ackerman, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,006

(22) Filed: Jul. 5, 2013

(65) Prior Publication Data

US 2013/0293784 A1 Nov. 7, 2013

Related U.S. Application Data

(63) Continuation of application No. 10/146,522, filed on May 14, 2002, now Pat. No. 8,505,063.

(60) Provisional application No. 60/359,033, filed on Feb. 22, 2002.

(51) Int. Cl.
*H04N 7/16* (2011.01)
*H04N 1/32* (2006.01)
*H04N 21/458* (2011.01)

(52) U.S. Cl.
CPC ....... *H04N 1/32683* (2013.01); *H04N 21/4586* (2013.01)
USPC ........... 725/143; 725/148; 725/149; 370/221; 370/225; 370/229

(58) Field of Classification Search
CPC ................. H04N 1/32683; H04N 21/4586
USPC ........... 725/143, 148, 149; 370/221, 225, 229
See application file for complete search history.

(56) References Cited

U.S. PATENT DOCUMENTS

| 4,404,589 A | 9/1983 | Wright, Jr. |
| 4,748,684 A | 5/1988 | Wright, Jr. |

(Continued)

OTHER PUBLICATIONS

U.S. Appl. No. 10/146,522 1; Decision on Appeal dated Mar. 14, 2013; 8 pages.

(Continued)

*Primary Examiner* — Pankaj Kumar
*Assistant Examiner* — Sahar Baig
(74) *Attorney, Agent, or Firm* — Swanson & Bratschun, L.L.C.

(57) ABSTRACT

A system and method for providing video signals wherein the video signals from a single video source may be separately passed over two different transmission paths. Each transmission path includes an encoder, a communications channel and a decoder. The output of each communications path at the decoder provides the video signals and an alarm signal. The alarm signal indicates an error or disruption of the video signals over the corresponding communications path. The outputted video and alarm signals are provided to a video protection switch (VPS) device which provides the video signal from the second transmission path if the alarm signals indicates an error or disruption in the first transmission path. In one embodiment, the VPS has multiple switches, one for each of plural video sources, and a redundant switch and protection ports. The redundant switch and protection ports may be connected to receive the video and alarm signals if one of the switches in the VPS fails.

16 Claims, 4 Drawing Sheets

(56) References Cited

U.S. PATENT DOCUMENTS

| | | | |
|---|---|---|---|
| 5,485,465 | A | 1/1996 | Liu et al. |
| 5,600,368 | A | 2/1997 | Matthews, III |
| 6,067,346 | A | 5/2000 | Akhteruzzaman et al. |
| 6,357,028 | B1 | 3/2002 | Zhu |
| 6,487,721 | B1 | 11/2002 | Safadi |
| 7,079,176 | B1 | 7/2006 | Freeman et al. |
| 8,505,063 | B2 | 8/2013 | Coufal et al. |
| 2003/0163829 | A1 | 8/2003 | Coufal et al. |

OTHER PUBLICATIONS

U.S. Appl. No. 10/146,522; Notice of Allowance dated Apr. 8, 2013; 17 pages.

U.S. Appl. No. 10/146,522; Issue Notification dated Jul. 17, 2013; 1 page.

U.S. Appl. No. 10/146,522; Non-Final Rejection dated Mar. 16, 2007; 12 pages.

U.S. Appl. No. 10/146,522; Advisory Action dated Nov. 5, 2007; 4 pages.

U.S. Appl. No. 10/146,522; Advisory Action dated Nov. 14, 2008; 2 pages.

U.S. Appl. No. 10/146,522; Advisory Action dated Nov. 24, 2008; 4 pages.

U.S. Appl. No. 10/146,522; Advisory Action dated Nov. 18, 2009; 2 pages.

U.S. Appl. No. 10/146,522; Final Rejection dated Sep. 1, 2009; 9 pages.

U.S. Appl. No. 10/146,522; Final Rejection dated Aug. 20, 2007; 13 pages.

U.S. Appl. No. 10/146,522; Final Rejection dated Aug. 20, 2008; 12 pages.

U.S. Appl. No. 10/146,522; Non-Final Rejection dated Feb. 27, 2009; 8 pages.

U.S. Appl. No. 10/146,522; Non-Final Rejection dated Feb. 4, 2008; 8 pages.

SYSTEMS AND METHODS FOR VIDEO TRANSMISSION

CROSS-REFERENCE TO RELATED APPLICATIONS

This application is a continuation of U.S. patent application Ser. No. 10/146,522, filed May 14, 2002 by William C. Coufal et al. and entitled, "Systems and Methods for Providing Redundant Back-up to a Video Transmission System", which application claims the benefit of U.S. Provisional Application No. 60/359,033, filed Feb. 22, 2002 by William C. Coufal et al. and entitled "Systems and Methods for Providing Redundant Back-Up to a Video Transmission System," the entire disclosures of which are hereby incorporated by reference.

BACKGROUND OF THE INVENTION

The present invention relates generally to a system and method for providing redundant back-up to a video transmission system, and more particularly to a video changeover switch that can switch a video signal from primary equipment to back-up equipment upon the failure of the primary equipment.

A contemporary video broadcasting system is illustrated in FIG. 1. Here, video signals from multiple video sources 130 (130-1 through 130-N) are transmitted to an editing location 105 through transmission equipment 100. In a typical system, transmission equipment 100 encodes the video signals and then transmits them over a communication path or channel (e.g., a fiber optic or electrical channel). Finally, the signals are decoded prior to entering editing location 105. At editing location 105, all of the signals from video sources 130 are tested, edited and/or mixed to produce one video signal that contains the best or preferred footage from the video sources. The edited video signal is then broadcast to viewers, for example, from a broadcast site 110. Viewers desiring to watch the broadcast receive the edited video signal with a receiver 115 and watch the broadcast with a television or other suitable video device. As one skilled in the art will appreciate, receiver 115 can be an antenna at a person's house, the TV itself, or any suitable receiver at a head-end of a cable provider.

During high profile broadcasting events (e.g., the Super Bowl or the Olympics) it is important for the broadcaster to avoid any disruption in the broadcast signal. Transmission interruptions can cause embarrassment, loss of income and ill will for the broadcaster. In most systems, a critical transmission path for the video signals is through transmission equipment 100. If transmission equipment 100 fails, the signal being broadcast to the viewers may be lost. Possible transmission equipment 100 failures include the loss of power in the encoders or decoders, failure of the encoders or decoders themselves, loss of signal in the channel due to channel failure, or the like. Thus, there is a need in the art for overcoming possible failures in transmission equipment 100 to prevent loss of the video signal to editing location 105.

BRIEF SUMMARY OF THE INVENTION

In accordance with one embodiment of the present invention, a system and method for providing a video delivery system with a redundant back-up is provided.

A more complete understanding of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

The present invention relates generally to a system and method for providing redundant back-up to a video transmission system, and more particularly to a video changeover switch that can switch a video signal from primary equipment to back-up equipment upon the failure of the primary equipment.

Figure 1:
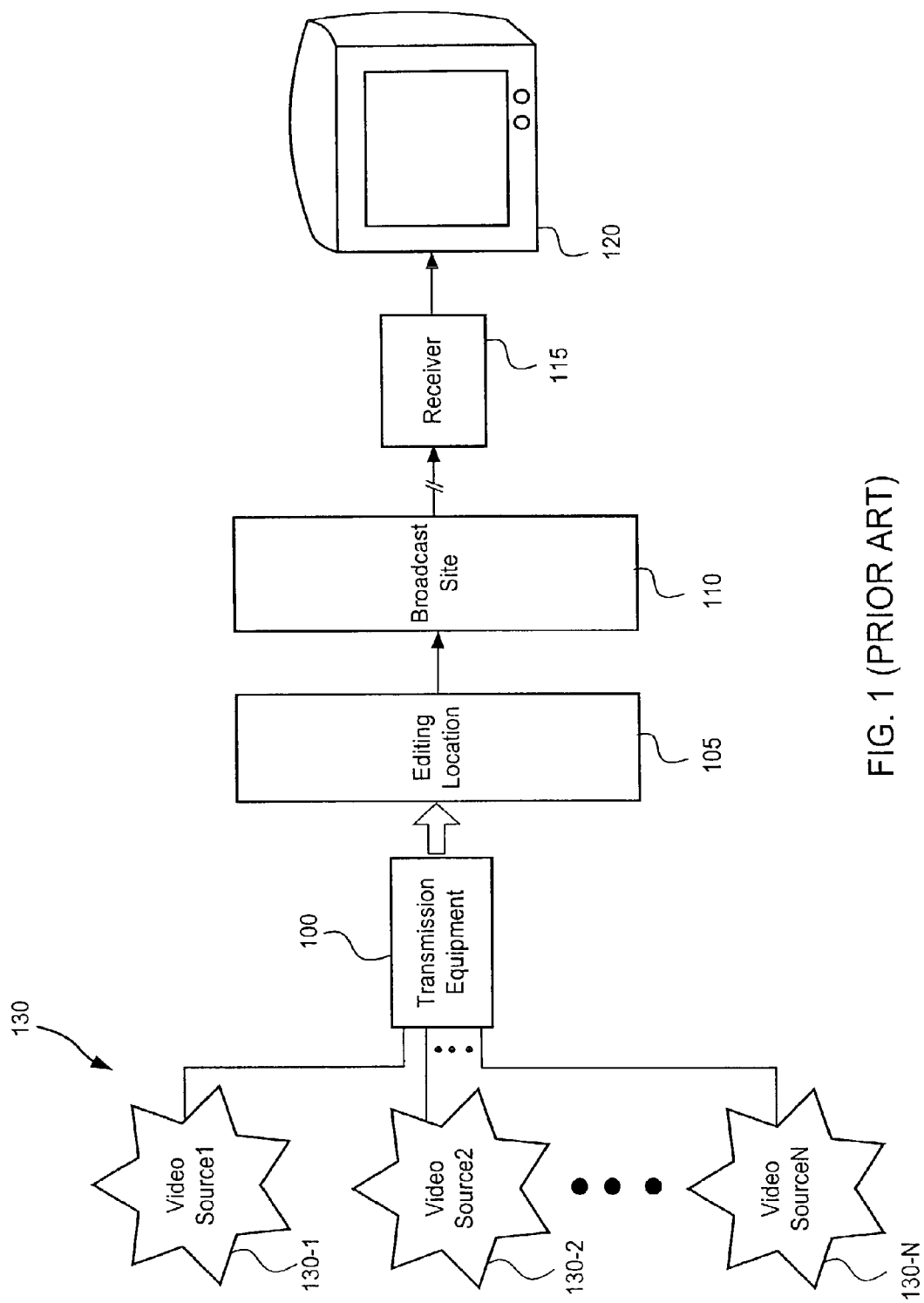
FIG. 1 is a block diagram of one embodiment of a video transmission system currently known in the art.
Figure 2:
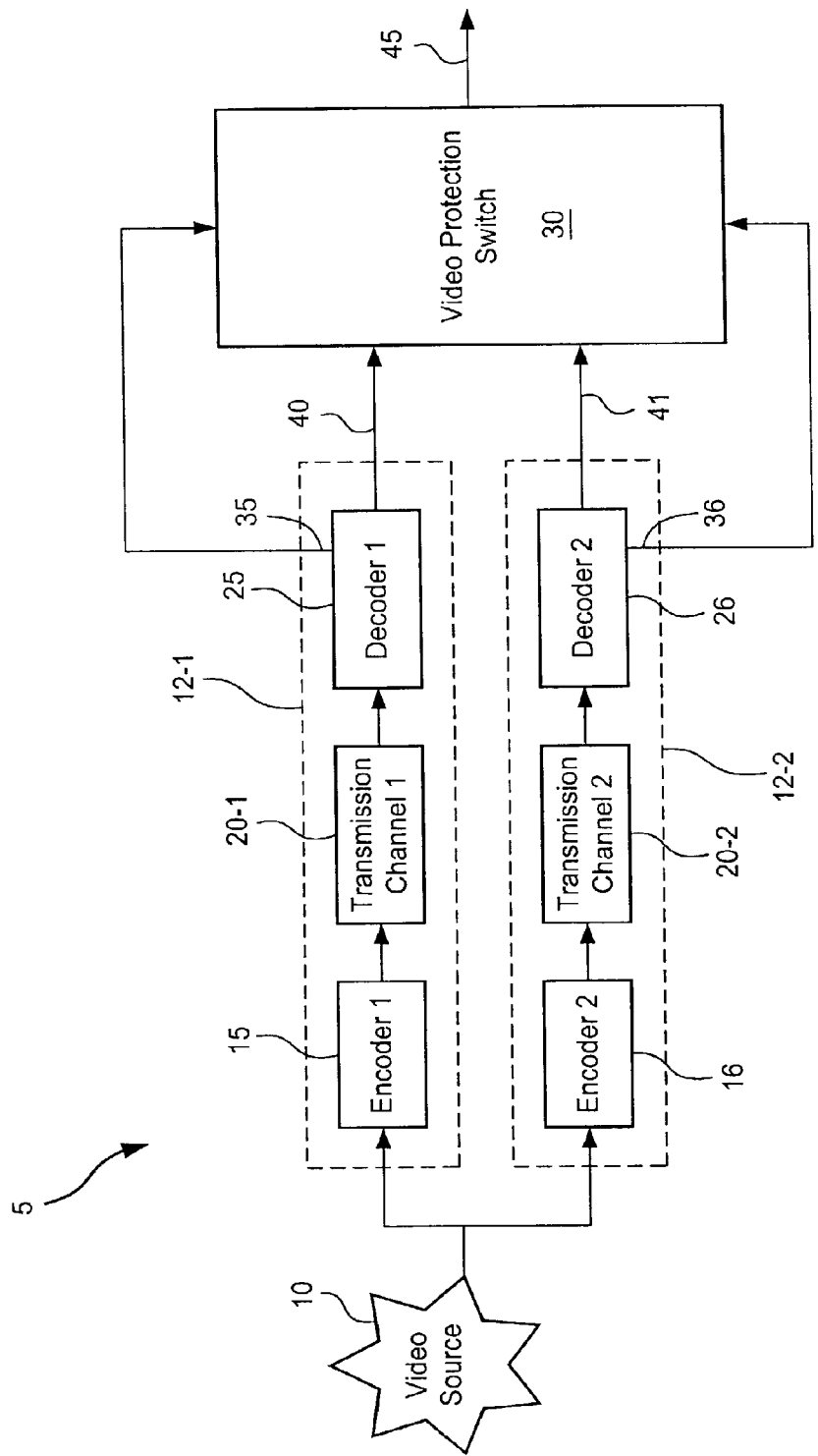
FIG. 2 is a block diagram of one embodiment of a video transmission system, in accordance with the present invention.

FIG. 2 illustrates one embodiment of a video transmission system 5 in accordance with the present invention. In the illustrated embodiment, video transmission system 5 comprises a video source 10, a first transmission path 12-1 and a second transmission path 12-2 through which the video signals from video source 10 pass, and remote from the video source 10, a video protection switch (VPS) 30 for switching between the video signals passed over the two transmission paths.

Video source 10 can be any video signal producing device, such as a video camera, a VCR, a DVD player, the Internet, a cable system, or the like. For example, while broadcasting a basketball game, a network may have several TV cameras covering the game, but only one signal typically is broadcast to the viewers at a time. Moreover, the network may use computers to generate instant replays, statistical views, player profiles, etc. Before broadcasting a signal to the viewing public, all of the signals from the various cameras, computers and other devices covering the game typically are transmitted to an editing location for signal editing, switching and/or mixing. This allows the network to produce and transmit the best footage possible for the TV broadcast.

As discussed above, the video signals from video source 10 pass through two transmission paths. In one embodiment, first transmission path 12-1 comprises a first encoder 15, a first transmission channel 20-1 and a first decoder 25, and second transmission path 12-2 comprises a second encoder 16, a second transmission channel 20-2 and a second decoder 26.

As one skilled in the art will appreciate, encoders 15, 16 can be any device that transforms the video signal from video source 10 into a signal that can be easily transmitted over a communication or transmission path. For example, encoders 15, 16 may convert the video signals into a compressed digital format, such as MPEG, MPEG2, or the like. Similarly, decoders 25, 26 typically are devices that convert the transmission signal back into a video signal. In one embodiment, encoders 15, 16 and decoders 25, 26 may comprise, for example, Digilink 1220 encoders/decoders from Artel Video Systems, Inc., Marlborough, Mass.

Moreover, transmission channels 20 may comprise any suitable communication channel. In accordance with one embodiment, transmission channels 20 comprise high bandwidth fiber optic cable. As one skilled in the art will appreciate, an optical multiplexer also may be used to place more than one signal on each fiber channel, such as, for example, the MegaWav optical multiplexer from Artel Video Systems, Inc.

As discussed in more detail below, video protection switch (VPS) 30 receives video signals 40 and 41 from the two transmission paths 12-1 and 12-2, respectively, and produces a video output signal 45 from one of the two input video signals 40 or 41. In addition, VPS 30 receives alarm signals from alarm relay outputs 35 and 36 at decoders 25 and 26, respectively. Alarm relay output 35 sends an alarm signal to VPS 30 upon a detection of a video signal error or failure in transmission path 12-1 (e.g., errors introduced by encoder 15, transmission channel 20-1, or decoder 25), and alarm relay output 36 sends an alarm signal to VPS 30 upon a detection of a video signal error or failure in transmission path 12-2. such error or alarm signals are provided in conventional decoders, such as the previously mentioned Digilink 1220 encoder/decoder). As discussed below, in the event of a video signal error or failure on one of transmission paths 12-1, 12-2, VPS 30 switches from the failing transmission path to the back-up or other transmission path.

Figure 3:
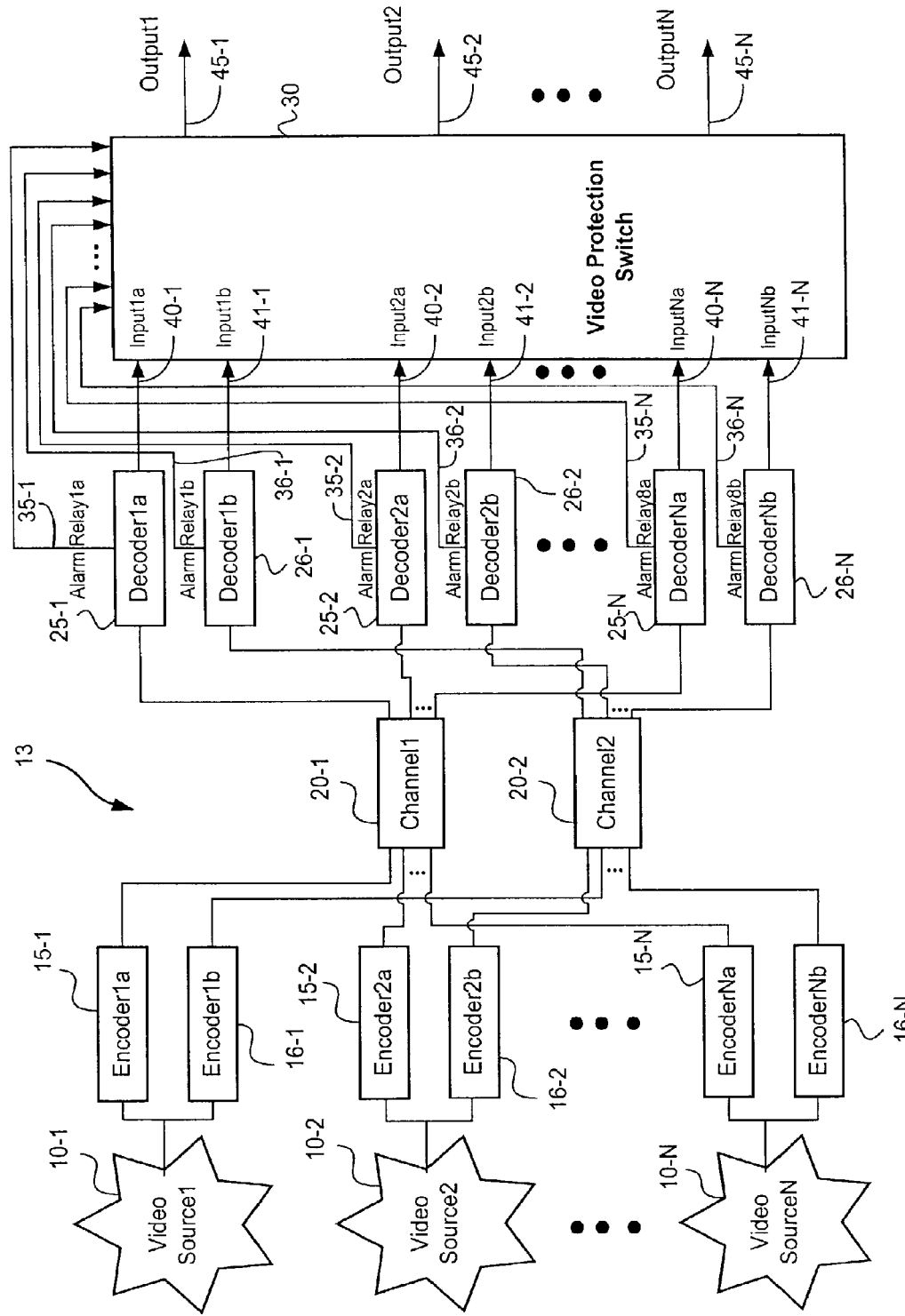
FIG. 3 is a block diagram of the video transmission system of FIG. 2 having a plurality of video sources.

FIG. 3 illustrates a video transmission system 13 having a plurality of video sources 10, each of which transmits video signals over two transmission paths in a manner similar to that in transmission system 5 in FIG. 2. Thus, in accordance with the embodiment illustrated in FIG. 3, the first transmission path for the video signal from video source 10-1 is first encoder 15-1, first transmission channel 20-1 and first decoder 25-1, and the second transmission path is second encoder 16-1, second transmission channel 20-2 and second decoder 26-1. Similarly, for the video signal from video source 10-N, the first transmission path is first encoder 15-N, first transmission channel 20-1 and first decoder 25-N, and the second transmission path is second encoder 16-N, second transmission channel 20-2 and second decoder 26-N.

As with the system in FIG. 2, VPS 30 generates a video output signal 45 from one of the video inputs 40, 41 into VPS 30 originating from each of the transmission paths. Accordingly, output signal 45-1 from VPS 30 is either video signal 40-1 originating from video source 10-1 and communicating through the first transmission path (encoder 15-1, transmission channel 20-1, and decoder 25-1) or video signal 41-1 communicating through the second transmission path (encoder 16-1, transmission channel 20-2, and decoder 26-1), depending on which path the VPS 30 is using. Similarly, output signal 45-N from VPS 30 is either video signal 40-N originating from video source 10-N and passing through the first transmission path (encoder 15-N, transmission channel 20-1, and decoder 25-N) or video signal 41-N passing through the second transmission path (encoder 16-N, transmission channel 20-2, and decoder 26-N).

Figure 4:
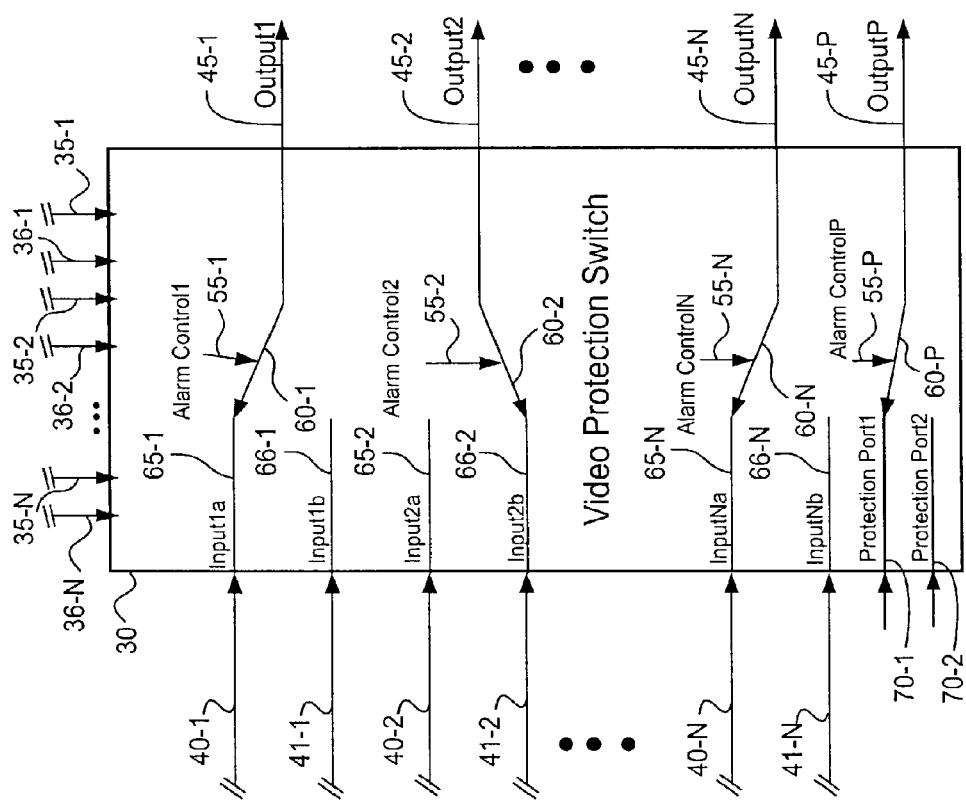
FIG. 4 is a block diagram of one embodiment of a video protection switch that can be used in the video transmission systems of FIGS. 2 and 3.

This is further illustrated in FIG. 4 which provides a more detailed illustration of one embodiment of VPS 30. In the illustrated embodiment, VPS 30 receives input signals from two transmission paths for each video source 10. That is, VPS 30 receives a first input signal 40-1 from the first transmission path for video source 10-1, and a second input signal 41-1 from the second transmission path for video source 10-1. Similarly, VPS 30 receives a first input signal 40-2 from the first transmission path for video source 10-2, and a second input signal 41-2 from the second transmission path for video source 10-2 (and so on).

In addition to receiving inputs 40, 41 from the two transmission paths, and more specifically from decoders 25 and 26, VPS 30 receives alarm signals from alarm relay outputs 35 and 36 from each of decoders 25 and 26, respectively. The alarm signals are provided to alarm controls 55 of switches 60 within VPS 30, which in turn control which switch input 65 or 66 is connected to the outputs 45. In the embodiment shown, VPS 30 can be pre-set so that the first input 65-1 is initially connected to output1 45-1 by way of the switch 60-1, and thus alarm control 55-1 is under the control of first alarm relay output 35-1 from decoder 25-1. If there is a problem with the signal input into the decoder 25-1, decoder 25-1 will send an alarm signal to the VPS 30 by way of alarm relay output 35-1. The alarm signal causes alarm control 55-1 to change the state of switch 60-1 to connect output 45-1 to receive the signal from the second input 66-1, and switch 60-1 stays in this state (i.e., input 66-1 provided to output 45-1) until reset. The other switches 60 operate in the same way, each connecting switch input 65 to the output 45 unless an alarm signal is received at one of the alarm relay outputs 35.

In FIG. 4, the VPS 30 is illustrated in operation after an alarm signal has been received from decoder 25-2, indicating an error in the video signal from video service 10-2 (an error in the first transmission path-encoder 15-2, channel 20-1, and decoder 25-2). In that event, switch 60-1 remains in the first state (input 65 connected to the out 45-1), but switch 60-2 has received an alarm signal (from alarm relay output 35-2) and has switched to the second state (input 66-2 connected to output 45-2).

In one embodiment, it is possible to use only the alarm relay outputs 35 (the alarm relay outputs 36 are not necessary), and each switch 60 is pre-set to connect input 65 to output 45. If an alarm signal is present on any one of the alarm relay outputs 35, the alarm control 55 for the corresponding switch changes to connect input signal 66 to the output 45, and that connection continues until the switch is manually reset to the original position (i.e., connecting input signal 65 to the output 45). In other embodiments, the alarm relay outputs 36 may be actively used, and when any switch 60 changes to the second state (input 66 connected to output 45 by virtue of an alarm signal on alarm relay output 35), the switch stays in that state until an alarm signal is provided at the corresponding alarm relay output 36. When that alarm signal from alarm relay output 36 is provided to the alarm control 55, the switch is automatically changed back to the first state (input 65 connected to the output 45), without the need for a manual reset.

Thus, the present invention provides means for overcoming a problem with a signal, while disrupting the transmission only momentarily, i.e. the brief switching time during which the alarm control 55 changes the one of the inputs 65 or 66 that is provided to output 45.

In the event of power failure, the state of the switches 60 are magnetically retained and the switches 60 continue to connect outputs 45 to the input signals connected before the power failure. Thus, the present invention provides a video protection switch that continues to function after power loss.

The VPS 30 may also be provided with protection ports 70-1, 70-2 according to one preferred embodiment of the present invention seen in FIG. 4. The ports 70-1, 70-2 provide access to an extra or redundant switch 60-P for connecting one of the inputs 40, 41 to an output 45, in the event one of the switches 60 fails or is otherwise inoperable. Thus, if during operation it is determined that one of the outputs 45 does not output the correct signal, the inputs 40, 41 corresponding to that output 45 may be physically switched to protection port 70-1 and protection port 70-2, respectively. For example, if output 45-2 is not outputting the correct signal due to a failure of switch 60-2, inputs 40-2, 41-2 may be physically disconnected from input 65-2 and input 66-2, respectively. The video signal inputs 40-2 and 41-2 may then be physically connected to protection port1 70-1 and protection port 70-2, respectively. Also, first alarm relay output 35-2 and second alarm relay output 36-2 (if used) are connected to alarm control 55-P of switch 60-P. Once connected, output 45-P will provide the signals from either the first input 40-2 or the second input 41-2, depending on the state of switch 60-P.

There are various modifications to the present invention that will be apparent to those of ordinary skill in the art. For instance, more redundancy may be provided by having more than two encoders and decoders per video source, the amount of channels being equal to the number of encoders and decoder per video source. The VPS 30 could be modified to allow for more inputs per output to increase to the redundancy of the system. For example, three encoders and decoders per video source may be provided with three channels to carry the signals. The VPS 30 would be modified to have three inputs per output and to receive three alarm relay outputs from the decoders.

Further, the VPS 30 can provide an external reset switch for each switch 60 individually (or all switches 60, collectively) so that the switches 60 may be reset manually at any time (reset to their original, pre-set state).

In conclusion, the present invention provides novel systems and methods for providing redundant back-up of a video transmission system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A video transmission system, comprising:
   a video source;
   a first video transmission path that receives a video signal from the video source and provides a first video output signal and an error signal, the error signal having a first state when no error is detected in the first video output signal and a second state upon detection of an error in the first video output signal;
   a second video transmission path that receives a video signal from the video source and provides a second video output signal; and
   a video protection switch that receives the first and second video output signals from the first and second video transmission paths and provides the first video output signal when the error signal is in the first state and providing the second video output signal when the error signal is in the second state, wherein the video protection switch replaces only the first video output signal when the error signal is in the second state, while other video output signals continue to be provided from the first transmission path.

2. A video transmission system for carrying video signals from first location to a second remote location, comprising:
   a video source at the first location;
   a first video transmission path in electrical communication with the video source, the first video transmission path comprising a first encoder, a first communication channel and a first decoder, the first decoder providing a first video output signal and an alarm relay signal, the alarm relay signal reflecting a disruption in the first video output signal;
   a second video transmission path in electrical communication with the video source, the second video transmission path comprising a second encoder, a second communication channel and a second decoder, the second decoder providing a second video output signal; and
   a video protection switch at the second remote location, comprising:
      a first input for receiving the first video output signal from the first decoder, and a second input for receiving the second video output signal from the second decoder;
      an output;
      a switch connected for receiving both the first and second video output signals, and pre-set to provide the first video output signal to the output of the video protection switch; and
      an alarm input for receiving the alarm relay signal;
      wherein when the first decoder detects a disruption in the first video output signal in the first transmission path, the alarm relay signal provided to the alarm input causes the video protection switch to provide the second video output signal at the output of the video protection switch, and wherein the video protection switch replaces only the first video output signal when the error signal is in the second state, while other video output signals continue to be provided from the first transmission path.

3. The system as recited in claim 2, wherein the second decoder provides a second alarm relay signal reflecting a disruption in the second video output signal, and the video protection switch further comprises a second alarm input for receiving the second alarm relay signal, and wherein when the second decoder detects a disruption in the video signal in the second transmission path, the second alarm relay signal provided to the second alarm input causes the video protection switch to provide the first video signal at the output of the video protection switch.

4. The system as recited in claim 2, wherein the video protection switch further comprises:
   first and second protection inputs;
   a protection switch;
   a protection alarm input; and
   a protection signal output;
   wherein when the switch of the video protection switch fails, the video output signals from the first decoder and second decoder may be provided to the first and second protection inputs, respectively, and the alarm signal provided to protection alarm input, so that the protection switch can be used to replace the failed switch.

5. The system as recited in claim 2, wherein the video protection switch further comprises:
   an alarm control controlling the switch and connected to the alarm input.

6. The system as recited in claim 5, wherein the alarm input further receives a second alarm relay signal from the second decoder, and wherein after providing the second video output signal in response to the first alarm signal, the alarm control controls the switch based on second alarm relay signal from the second decoder.

7. The system as recited in claim 5, wherein after switching in response to the received alarm relay signal from the first decoder, the video protection switch continues to provide the second video output signal at the output of the video protection switch until manually reset.

8. The system as recited in claim 2, wherein the disruption of the video signal is a failure in the first encoder, first channel, or first decoder.

9. A method for transmitting video, the method comprising:
- providing a first encoder and a second encoder connected to a video source;
- providing a plurality of channels, a first channel connected to the first encoder and a second channel connected to the second encoder;
- providing a first decoder and a second decoder, with the first decoder providing an alarm relay signal, the first decoder in electrical communication with the first encoder by way of the first channel and providing a first video signal from the video source, and the second decoder in electrical communication with the second encoder by way of the second channel and providing a second video signal from the video source;
- providing a video protection switch, the video protection switch comprising a first and a second signal input connected for receiving the first and second video signals from the first and second decoders, an alarm input connected for receiving the alarm relay signal from the first decoder, a signal output, and a switch controlled by the alarm relay signal;
- in response to receiving the alarm relay signal, changing a state of the video protection switch from one state providing the first video signal at its output to a second state providing the second video signal at its output, wherein changing the state of the video protection switch comprises replacing only the first output signal in response to receiving the alarm relay signal, while other video signals continue to be provided from the first channel.

10. A method for transmitting a video signal from a video source, comprising:
- encoding a plurality of signals from a video source;
- transmitting each encoded signal on a different one of a plurality of channels; at a remote location from the video source, decoding each signal separately;
- inputting each of the decoded signals into a video protection switch;
- outputting a first of the decoded signals from the video protection switch; and
- if there is an error in the first decoded signal, switching the state of the video protection switch to output a second of the decoded signals from the video protection switch, the video protection switch replacing only the first decoded signal, while other video output signals continue to be provided from the first channel.

11. The method as recited in claim 10, wherein the error in the first decoded signal is a failure in the transmission by way of the channel or an error during encoding or decoding.

12. A video transmission system, comprising:
- video source means for providing video signals;
- first video transmission path means for receiving a video signal from the video source means and providing a first video output signal and an error signal, the error signal having a first state when no error is detected in the first video output signal and a second state upon detection of an error in the first video output signal;
- second video transmission path means for receiving a video signal from the video source and providing a second video output signal; and
- video protection switch means for receiving the first and second video output signals from the first and second video transmission path means and providing the first video output signal when the error signal is in the first state and a providing the second video output signal when the error signal is in the second state, wherein the video protection switch mean replaces only the first video output signal when the error signal is in the second state, while other video output signals continue to be provided from the first transmission path.

13. The system of claim 12, wherein the video protection switch means is at a location remote from the video source means.

14. The system of claim 13, wherein the first and second transmission path means each comprise a fiber optic cable.

15. The system of claim 12, wherein the video source means comprises a plurality of video sources, each video source providing a video signal, and wherein the first and second transmission path means both carry the same video signal from each video source.

16. The system of claim 12, wherein each of the first and second 2 transmission means comprises an encoder for encoding the video signals from the video source means, a fiber optic cable for carrying the encoded signals, and a decoder for decoding the encoded signals and providing the decoded signal to the video protection switch means, and wherein the decoder in the first transmission means provides the error signal when an error is detected in the decoded signal.

* * * * *